US012203638B1

(12) United States Patent
Li

(10) Patent No.: US 12,203,638 B1
(45) Date of Patent: Jan. 21, 2025

(54) FLASHLIGHT CAPABLE OF ACHIEVING ONE-KEY LOCKING

(71) Applicant: Wenjie Li, Guangdong (CN)

(72) Inventor: Wenjie Li, Guangdong (CN)

( * ) Notice: Subject to any disclaimer, the term of this patent is extended or adjusted under 35 U.S.C. 154(b) by 0 days.

(21) Appl. No.: 18/512,416

(22) Filed: Nov. 17, 2023

(30) Foreign Application Priority Data

Oct. 12, 2023 (CN) ......................... 202322748377.2

(51) Int. Cl.
*F21V 23/04* (2006.01)
*F21L 4/00* (2006.01)

(52) U.S. Cl.
CPC .......... *F21V 23/0421* (2013.01); *F21L 4/005* (2013.01); *F21V 23/0457* (2013.01)

(58) Field of Classification Search
CPC ............. F21V 23/0414; F21V 23/0421; F21V 23/0428
See application file for complete search history.

(56) References Cited

U.S. PATENT DOCUMENTS 7,922,350 B1 * 4/2011 Siu ....................... H01H 25/065 362/202
10,012,372 B2 * 7/2018 Marie .................... H05B 45/14
2005/0122710 A1 * 6/2005 Kim ....................... H05B 45/14 362/157
2005/0122712 A1 * 6/2005 Kim ....................... H05B 47/10 362/184
2005/0122714 A1 * 6/2005 Matthews .............. H05B 45/14 362/276
2005/0128741 A1 * 6/2005 Matthews .............. H01H 13/64 362/202
2005/0237737 A1 * 10/2005 Kim ....................... H05B 47/10 362/197

(Continued)

FOREIGN PATENT DOCUMENTS

DE 102007030897 A1 * 1/2008 .............. F21L 4/085

*Primary Examiner* — Alexander K Garlen
(74) *Attorney, Agent, or Firm* — MUNCY, GEISSLER, OLDS & LOWE, P.C.

(57) ABSTRACT

Disclosed herein is a flashlight capable of achieving one-key locking, including an illumination switch, a flashlight body and a lamp base provided at one end of the flashlight body and internally provided with a lamp bead, and further including: a flashlight tail connected to the end of the flashlight body away from the lamp base, a control assembly fixedly provided inside the flashlight tail and in signal connection with a lamp bead driving circuit and the illumination switch respectively, and a toggle switch slidably mounted on an outer side of the flashlight tail and provided with at least two gears in a direction parallel to an axial direction of the flashlight body, where the toggle switch is configured to toggle in a reciprocating manner between the two adjacent gears so as to transmit a locking signal or an unlocking signal to the control assembly. With regard to the toggle switch located on the flashlight tail and capable of moving in the direction parallel to the axial direction of the flashlight body, when the flashlight body is held by one hand, the gears can be changed by pushing the toggle switch directly in the axial direction of the flashlight body, then one-key locking of the flashlight can be achieved, the operation process is relatively convenient, and use requirements of a user can be met.

18 Claims, 6 Drawing Sheets

(56) References Cited

U.S. PATENT DOCUMENTS

| | | | | |
|---|---|---|---|---|
| 2008/0272714 | A1* | 11/2008 | Noble | F21L 4/027<br>315/292 |
| 2010/0277295 | A1* | 11/2010 | Matthews | F21V 23/0421<br>340/332 |
| 2011/0204826 | A1* | 8/2011 | Skrivan | F21V 23/0414<br>315/313 |
| 2012/0002691 | A1* | 1/2012 | Tao | F21L 4/00<br>372/38.07 |
| 2012/0120639 | A1* | 5/2012 | Armer | F21L 4/027<br>362/158 |
| 2017/0191646 | A1* | 7/2017 | Marie | F21V 23/0407 |
| 2021/0222842 | A1* | 7/2021 | Sharrah | F21V 21/145 |

* cited by examiner

FLASHLIGHT CAPABLE OF ACHIEVING ONE-KEY LOCKING

TECHNICAL FIELD

The present invention belongs to the technical field of flashlights, and particularly relates to a flashlight capable of achieving one-key locking.

BACKGROUND

As hand-held illumination tools, flashlights are widely used in outdoor adventures or in daily life, wherein batteries are used as energy sources, and the batteries and light-emitting electric beads constitute electric circuits. When switch is turned on, the circuits are connected, and currents flow through the electric beads to enable the electric beads to emit light, thereby achieving the illumination purpose.

Power source of the traditional flashlight is connected or disconnected by means of a tail switch or a side push switch, which has a defect that when the flashlight is placed in knapsack or trousers pocket, the switches are likely to be turned on automatically due to misoperation. After touch by mistake, waste of the power source will be caused by long-time turning-on of the flashlight, and there is no power when light source is needed in emergency, resulting in poor user experience. In addition, if the flashlight is placed in the knapsack or the trousers pocket when being turned on, local overheating occurs easily, resulting in the fire risk. Besides, locking can be achieved through long-time pressing or double clicking of the switch for some flashlights later in the market, however, the operation is inconvenient, and use requirements of users cannot be met.

SUMMARY

The present invention aims to provide a flashlight capable of achieving one-key locking, which can achieve one-key locking, avoid power waste caused when a user touches an illumination switch by mistake, is convenient to operate, and can meet users' requirements.

The present invention may be achieved as follows:

The flashlight includes an illumination switch, a flashlight body and a lamp base provided at one end of the flashlight body and internally provided with a lamp bead. The flashlight further includes a flashlight tail connected to another end of the flashlight body away from the lamp base, a control assembly fixedly provided inside the flashlight tail and in signal connection with a lamp bead driving circuit and the illumination switch respectively, and a toggle switch slidably mounted on an outer side of the flashlight tail and provided with at least two gears in a direction parallel to an axial direction of the flashlight body, where the toggle switch is configured to toggle in a reciprocating manner between the two adjacent gears so as to transmit a locking signal or an unlocking signal to the control assembly, and when the control assembly receives the locking signal from the toggle switch, the control assembly transmits a disconnection instruction to the lamp bead driving circuit; and when the control assembly receives the unlocking signal from the toggle switch, the control assembly recognizes a switch signal of the illumination switch and transmits a connection instruction or the disconnection instruction to the lamp bead driving circuit according to a recognition result.

With regard to the flashlight capable of achieving one-key locking in the present invention, by pushing the toggle switch provided on the flashlight tail, switching of the different gears is achieved and a corresponding signal is transmitted to the control assembly, and after receiving the corresponding signal, the control assembly performs adjustment and outputs a corresponding instruction, thereby connecting or disconnecting the lamp bead driving circuit, and then achieving one-key locking of the illumination switch of the flashlight. After locking, the lamp bead cannot emit light no matter whether the user presses the illumination switch of the flashlight, thereby avoiding power waste caused when the user touches the illumination switch by mistake. In addition, by means of the toggle switch located on the flashlight tail and capable of moving in the direction parallel to the axial direction of the flashlight body, when the flashlight body is held by one hand, the gears can be changed by pushing the toggle switch directly in the axial direction of the flashlight body, then one-key locking of the flashlight can be achieved. The operation process is relatively convenient, and the use requirements of the user can be met.

Preferably, the control assembly includes a microcontroller unit (MCU) and a Hall sensor which are fixedly provided inside the flashlight tail, the Hall sensor is electrically connected to the MCU, the MCU is in signal connection with the lamp bead driving circuit and the illumination switch respectively, the toggle switch is disposed close to the Hall sensor and is configured to change an external magnetic field of the Hall sensor so as to change a voltage signal transmitted to the MCU by the Hall sensor, and the MCU is configured to recognize the locking signal or the unlocking signal according to different voltage signals.

Preferably, the flashlight tail is inwardly provided with a sliding groove from an outer side surface, the toggle switch is slidably embedded in the sliding groove and is provided with the two gears, a toggle direction of the toggle switch is parallel to the axial direction of the flashlight body, and the toggle switch can be in contact with inner walls of two sides of the sliding groove parallel to the axial direction of the flashlight body respectively, so as to achieve switching of the two gears.

Preferably, the toggle switch includes a toggle key, a magnetic block and a gear slider which are sequentially connected from outside to inside, the gear slider is slidably mounted inside the sliding groove, and an outer side wall of the toggle key is exposed out of an end port of the sliding groove.

Preferably, the sliding groove includes a first square groove and a second square groove which are sequentially connected from outside to inside and have lengthwise directions parallel to the axial direction of the flashlight body, the length of the first square groove is less than the length of the second square groove, and the width of the first square groove is less than the width of the second square groove; the gear slider is slidably connected inside the second square groove, outer walls of two sides of the gear slider respectively abut against inner walls of two sides of the second square groove in a widthwise direction, and outer walls of another two sides of the gear slider are configured to be in contact with inner walls of two sides of the second square groove in a lengthwise direction respectively so as to achieve change of the magnetic field of the Hall sensor; and the outer side wall of the toggle key is exposed out of the first square groove.

Preferably, the middle of the gear slider is provided with an opening on the side close to the toggle key for accommodating the magnetic block, and the toggle key is snap-fitted with the gear slider and blocks the opening so as to fix the magnetic block.

Preferably, two ends of the gear slider are symmetrically provided with two snap-fitting grooves, and the side of the toggle key close to the gear slider is provided with two protrusions fitted with the snap-fitting grooves.

Preferably, the side of the toggle key away from the gear slider is provided with anti-slip stripes.

Preferably, the flashlight tail is set as a cylindrical body and is fixedly mounted at the end of the flashlight body away from the lamp base.

Preferably, the illumination switch is set as a push switch, and the push switch is mounted on the side of the flashlight tail away from the flashlight body.

Compared with the prior art, the present invention has the beneficial effects as follows:

By pushing the toggle switch provided on the flashlight tail, switching of the different gears is achieved and a corresponding signal is transmitted to the control assembly, and after receiving the corresponding signal, the control assembly performs adjustment and outputs a corresponding instruction, thereby connecting or disconnecting the lamp bead driving circuit, and then achieving one-key locking of the illumination switch of the flashlight. After locking, the lamp bead cannot emit light no matter whether the user presses the illumination switch of the flashlight, thereby avoiding power waste caused when the user touches the illumination switch by mistake. In addition, by means of the toggle switch located on the flashlight tail and capable of moving in the direction parallel to the axial direction of the flashlight body, when the flashlight body is held by one hand, the gears can be changed by pushing the toggle switch directly in the axial direction of the flashlight body, then one-key locking of the flashlight can be achieved. The operation process is relatively convenient, and the use requirements of the user can be met.

Figure 1:
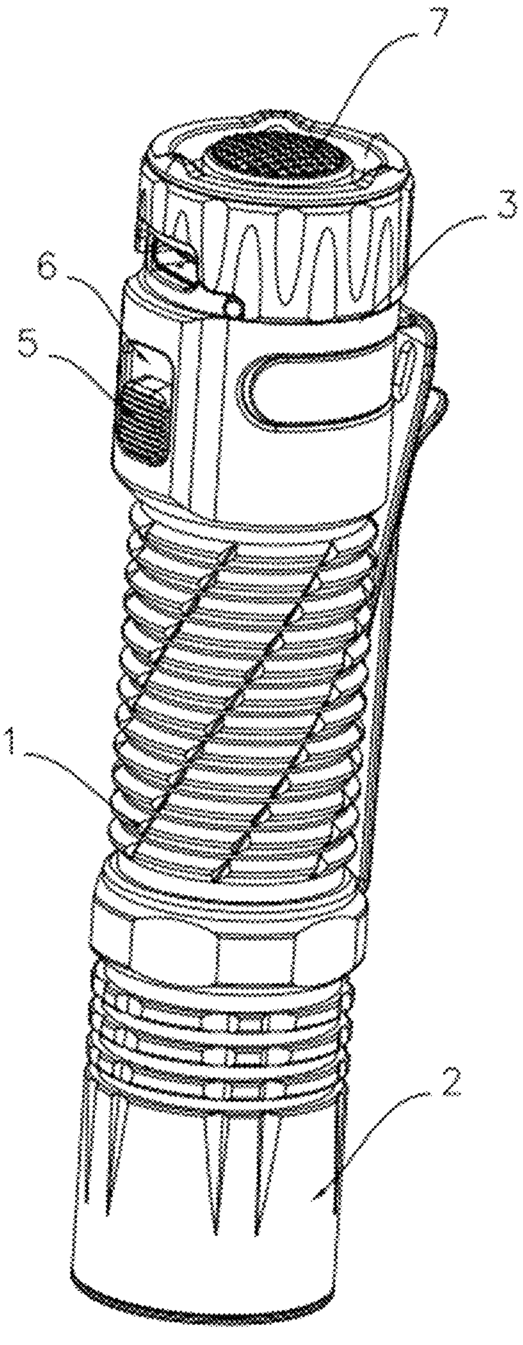
FIG. 1 is a three-dimensional structure diagram of a flashlight capable of achieving one-key locking provided in the present invention.
Figure 2:
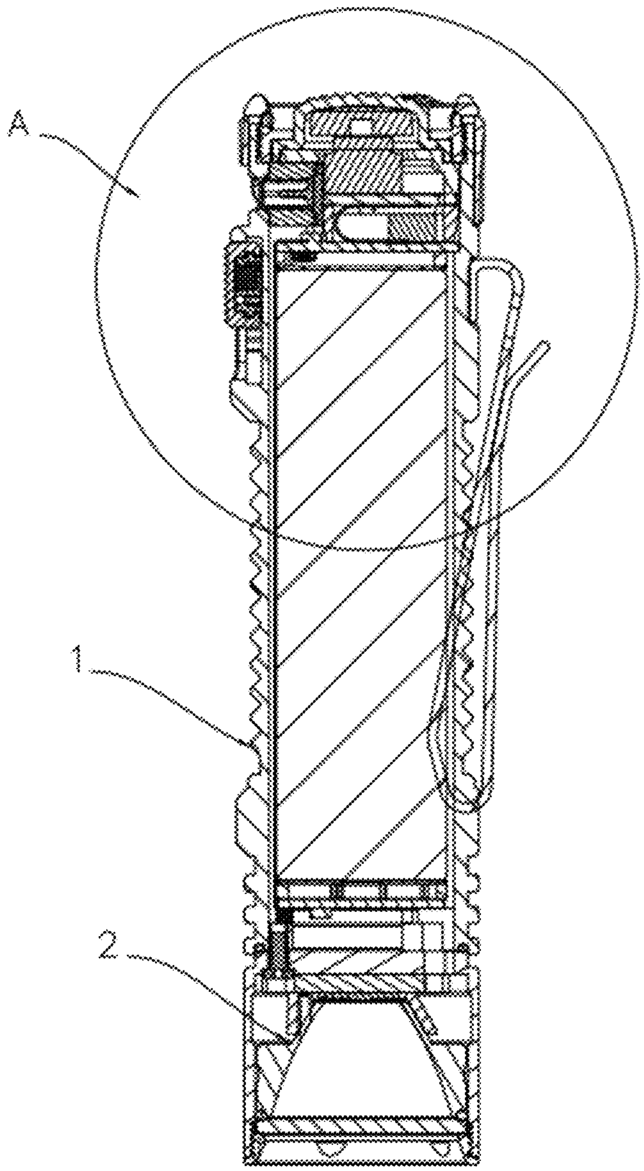
FIG. 2 is a side sectional view of the flashlight capable of achieving one-key locking provided in the present invention.
Figure 3:
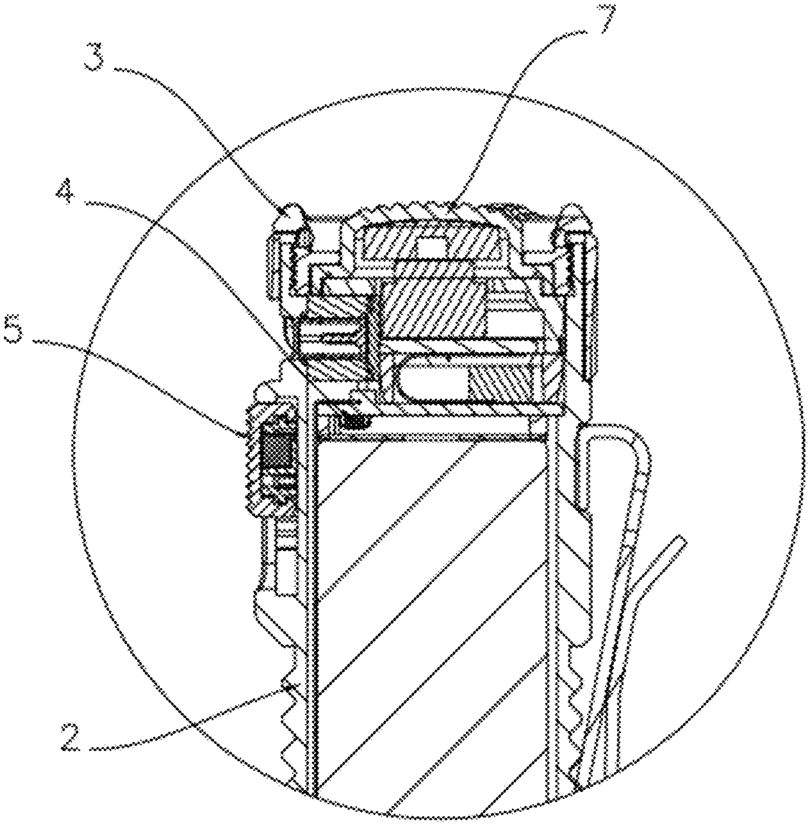
FIG. 3 is a partial enlarged view at A in FIG. 2.
Figure 4:
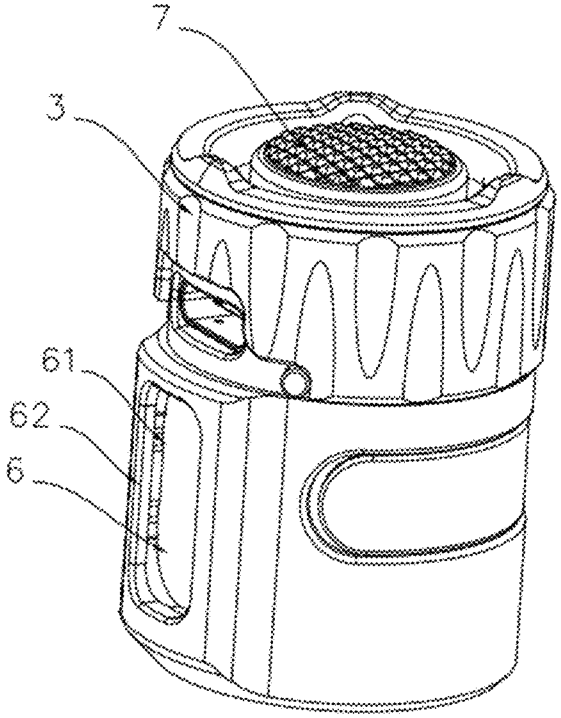
FIG. 4 is a three-dimensional structure diagram of a flashlight tail of the flashlight capable of achieving one-key locking provided in the present invention.

In the drawings: 1. flashlight body, 2. lamp base, 3. flashlight tail, 4. Hall sensor, 5. toggle switch, 51. toggle key, 511. protrusion, 512. anti-slip stripe, 52. magnetic block, 53. gear slider, 531. opening, 532. snap-fitting groove, 6. sliding groove, 61. first square groove, 62. second square groove, and 7. illumination switch.

DETAILED DESCRIPTION OF EMBODIMENTS

In order to make the purposes, technical solutions and advantages of embodiments of the present application more clear, the specific technical solutions in the present application will be further described in detail below in combination with the accompanying drawings in the embodiments of the present application. The embodiments below are intended to illustrate the present application, but are not intended to limit the scope of the present application.

In the embodiments of the present application, the terms “first” and “second” are only for the purpose of describing, and cannot be understood as indicating or implying the relative importance or implicitly indicating the number of technical features indicated. Thus, the features defined as “first” and “second” may explicitly or implicitly include one or more such features. In the descriptions of the embodiments of the present application, unless otherwise specified, “a plurality of” means two or more.

In addition, in the embodiments of the present application, the orientation terms “upper”, “lower”, “left”, “right” and the like are defined relative to the schematic placement orientations of components in the drawings, and it should be understood that these orientation terms are relative concepts used for relative descriptions and clarifications and can be changed correspondingly according to the change of the placement orientations of the components in the drawings.

In the embodiments of the present application, unless otherwise expressly specified and limited, the term “connection” should be understood in a broad sense, for example, the “connection” can be fixed connection, or detachable connection, or integral connection; and it can be direct connection or indirect connection by means of an intermediate medium.

In the embodiments of the present application, the term “including”, “comprising” or any other variation thereof is intended to cover the non-exclusive inclusion, such that a process, method, object or device including a series of elements includes not only those elements, but also other elements that are not explicitly listed, or also include inherent elements of the process, method, object or device. In case of no more limitations, an element defined by the statement “including a/an . . . ” does not exclude the existence of other identical elements in the process, method, object or device including the element.

In the embodiments of the present application, the wording “exemplary” or “for example” are used to indicate an example, an illustration, or an explanation. In the embodiments of the present application, any embodiment or design scheme described as “exemplary” or “for example” should not be explained as more preferred or advantageous than other embodiments or design schemes. The wording “exemplary” or “for example” is used to present a relevant concept in a specific manner.

Embodiment 1

As shown in FIGS. 1-6, which are structure diagrams of a flashlight capable of achieving one-key locking provided in the present invention, the flashlight includes an illumination switch 7, a flashlight body 1 and a lamp base 2 provided at one end of the flashlight body 1 and internally provided with a lamp bead. The flashlight further includes a flashlight tail 3 connected to another end of the flashlight body 1 away from the lamp base 2, a control assembly fixedly provided inside the flashlight tail 3 and in signal connection with a lamp bead driving circuit and the illumination switch 7 respectively, and a toggle switch 5 slidably mounted on an outer side of the flashlight tail 3 and provided with at least two gears in a direction parallel to an axial direction of the flashlight body 1, where the toggle switch 5 is configured to toggle in a reciprocating manner between the two adjacent gears so as to transmit a locking signal or an unlocking signal to the control assembly, and when the control assembly receives the locking signal from the toggle switch 5, the control assembly transmits a disconnection instruction to the lamp bead driving circuit; and when the control assembly receives the unlocking signal from the toggle switch 5, the control assembly recognizes a switch signal of the illumination switch 7 and transmits a connection instruction or the disconnection instruction to the lamp bead driving circuit according to a recognition result.

During practical application of this embodiment, by pushing the toggle switch 5 provided on the flashlight tail 3, switching of the different gears is achieved and a corresponding signal is transmitted to the control assembly, and after receiving the corresponding signal, the control assembly performs adjustment and outputs a corresponding instruction, thereby connecting or disconnecting the lamp bead driving circuit, and then achieving one-key locking of the illumination switch 7 of the flashlight. After locking, the lamp bead cannot emit light no matter whether a user presses the illumination switch 7 of the flashlight, thereby avoiding power waste caused when the user touches the illumination switch 7 by mistake; in addition, by means of the toggle switch 5 located on the flashlight tail 3 and capable of moving in the direction parallel to the axial direction of the flashlight body 1, when the flashlight body 1 is held by one hand, the gears can be changed by pushing the toggle switch 5 directly in the axial direction of the flashlight body 1, then one-key locking of the flashlight can be achieved, the operation process is relatively convenient, and use requirements of the user can be met.

Figure 7:
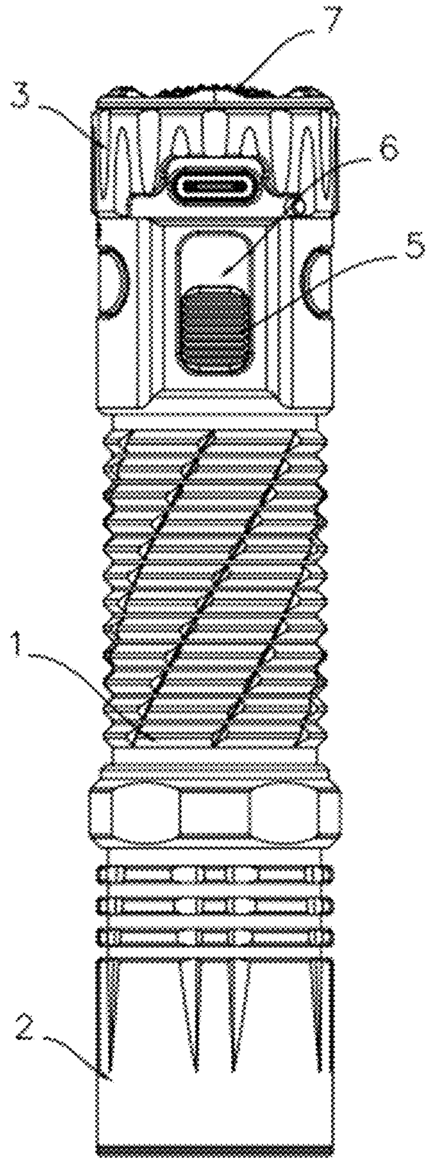
FIG. 7 is a three-dimensional structure diagram of the flashlight capable of achieving one-key locking provided in the present invention in an unlocked state.
Figure 8:
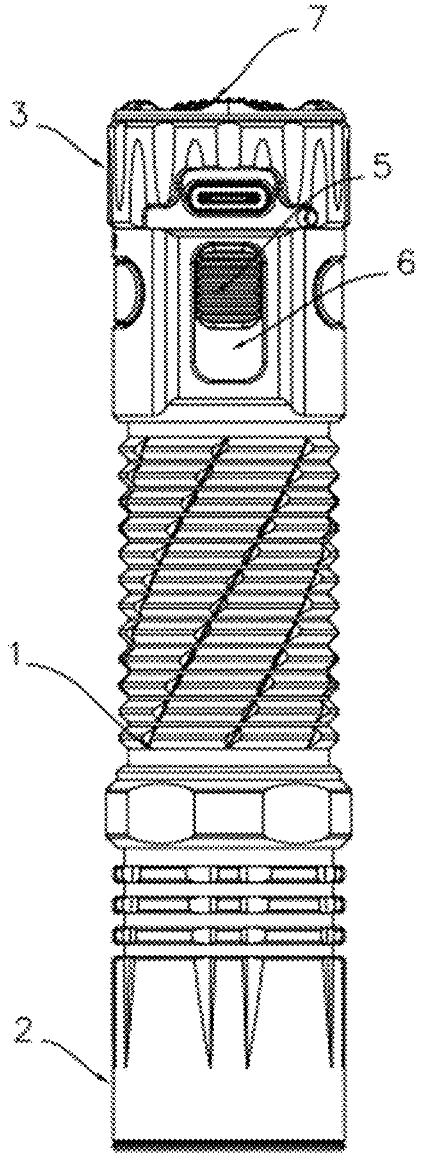
FIG. 8 is a three-dimensional structure diagram of the flashlight capable of achieving one-key locking provided in the present invention in a locked state.

It should be noted that, as shown in FIGS. 7 and 8, which correspond to structure diagrams of the flashlight in an unlocked state and in a locked state in sequence, when the lamp bead driving circuit is locked, the illumination switch 7 of the flashlight is also disabled, thereby achieving one-key locking of the flashlight.

In one case of this embodiment, the gears of the toggle switch 5 can be set as required, thereby achieving the states of the lamp bead driving circuit in correspondence to the different gears, for example, in addition to connecting and disconnecting the lamp bead driving circuit, the different gears can also correspond to different brightness or colors of the lamp bead, and thus the number of the gears of the toggle switch 5 is not specified restrictively.

During practical application of this embodiment, the control assembly includes an MCU and a Hall sensor 4 which are fixedly provided inside the flashlight tail 3. The Hall sensor 4 is electrically connected to the MCU, the MCU is in signal connection with the lamp bead driving circuit and the illumination switch 7 respectively, the toggle switch 5 is disposed close to the Hall sensor 4 and is configured to change an external magnetic field of the Hall sensor so as to change a voltage signal transmitted to the MCU by the Hall sensor 4, and the MCU is configured to recognize the locking signal or the unlocking signal according to different voltage signals.

It can be seen that the external magnetic field of the Hall sensor 4 is changed by means of the toggle switch 5, then the voltage signal transmitted to the MCU by the Hall sensor 4 is changed, and the MCU can recognize the locking signal or the unlocking signal according to the different voltage signals, thereby connecting or disconnecting the lamp bead driving circuit.

Embodiment 2

Figure 6:
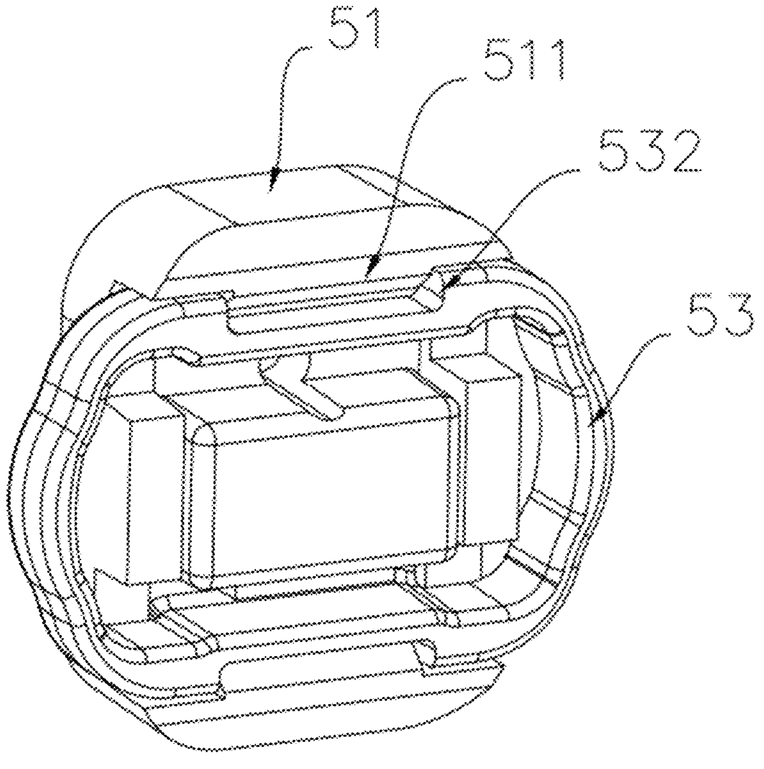
FIG. 6 is a three-dimensional structure diagram of the toggle switch of the flashlight capable of achieving one-key locking provided in the present invention.

As shown in FIG. 6, on the basis of Embodiment 1, the flashlight tail 3 is inwardly provided with a sliding groove 6 from an outer side surface, the toggle switch 5 is slidably embedded in the sliding groove 6 and is provided with the two gears, a toggle direction of the toggle switch 5 is parallel to the axial direction of the flashlight body 1, and the toggle switch can be in contact with inner walls of two sides of the sliding groove 6 parallel to the axial direction of the flashlight body 1 respectively, so as to achieve switching of the two gears.

It can be seen that by means of the sliding groove 6 formed in the flashlight tail 3, the toggle switch 5 can be mounted conveniently, and the toggle direction thereof can be limited, thereby ensuring that the actual toggle direction is parallel to the axial direction of the flashlight body 1; and the toggle switch 5 is in contact with the inner walls of the two sides of the sliding groove 6 respectively, thereby achieving switching of the two gears, which correspond to unlocking and locking of the flashlight.

Figure 5:
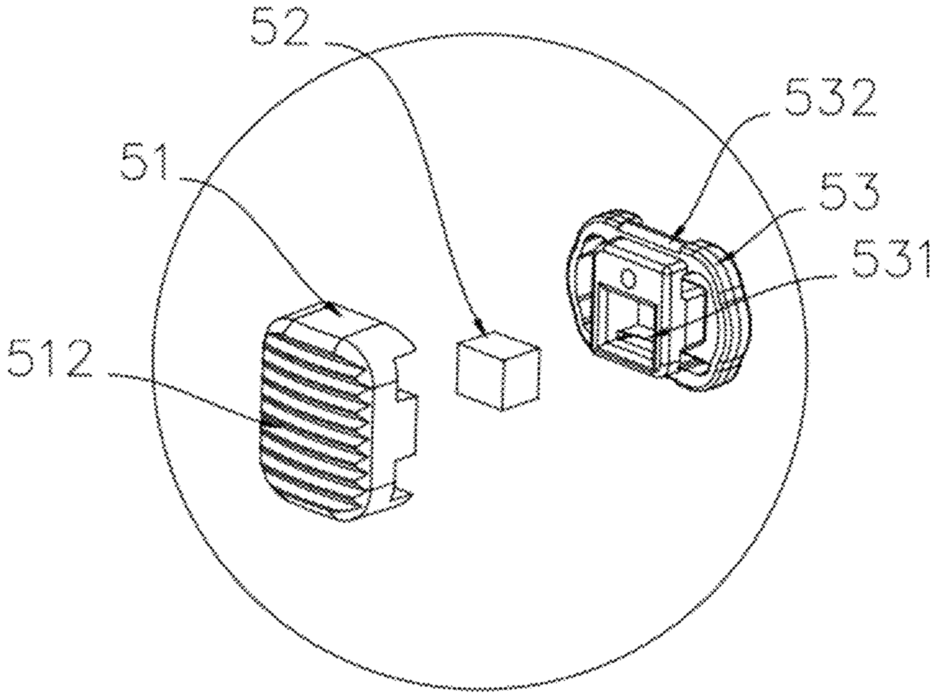
FIG. 5 is an exploded view of a toggle switch of the flashlight capable of achieving one-key locking provided in the present invention.

Further, as shown in FIGS. 5 and 6, the toggle switch 5 includes a toggle key 51, a magnetic block 52 and a gear slider 53 which are sequentially connected from outside to inside, the gear slider 53 is slidably mounted inside the sliding groove 6, and an outer side wall of the toggle key 51 is exposed out of an end port of the sliding groove 6.

Further, the sliding groove 6 includes a first square groove 61 and a second square groove 62 which are sequentially connected from outside to inside and have lengthwise directions parallel to the axial direction of the flashlight body 1. The length of the first square groove 61 is less than the length of the second square groove 62, and the width of the first square groove 61 is less than the width of the second square groove 62. The gear slider 53 is slidably connected inside the second square groove 62, outer walls of two sides of the gear slider respectively abut against inner walls of two sides of the second square groove 62 in a widthwise direction, and outer walls of another two sides of the gear slider are configured to be in contact with inner walls of two sides of the second square groove 62 in a lengthwise direction respectively so as to achieve change of the magnetic field of the Hall sensor 4; and the outer side wall of the toggle key 51 is exposed out of the first square groove 61.

It can be seen that the toggle switch 5 is configured to include the toggle key 51, the magnetic block 52 and the gear slider 53 which are assembled sequentially, and the gear slider 53 slidably abuts against the inner walls of the two sides of the second square groove 62 in the widthwise direction, such that the entire toggle switch 5 reciprocates in the direction parallel to the axial direction of the flashlight body 1, and there is a certain pre-tightening force with the inner walls of the two sides, which prevents the gear slider 53 from moving freely in an unrestrained manner inside the second square groove 62; and the inner walls of the two sides of the second square groove 62 in the lengthwise direction can sequentially correspond to the two gears of the toggle switch 5, thereby achieving switching of the two states.

It should be noted that the Hall sensor 4 can be subjected to magnetic induction with the magnetic block 52 of the toggle switch 5. The toggle switch 5 drives the magnetic block 52 to move in the toggle process, the Hall sensor 4 detects the change of the magnetic field so as to convert a changed magnetic field signal into the voltage signal and output the same to the MCU, the MCU can detect the position of the toggle switch 5 after processing the voltage signal and can receive the locking signal or the unlocking signal of the toggle switch, in combination with a digital signal of the illumination switch 7, after program logic operation, the MCU can obtain an instruction for controlling connection and disconnection of the lamp bead driving circuit and transmit the instruction to the lamp bead driving circuit, thereby adjusting the working state thereof, and achieving connection and disconnection of the lamp bead driving circuit.

As an example, in this embodiment, signal transmission can be performed on the MCU by means of a toggle stop block and an optical sensor, thereby transmitting the locking signal or the unlocking signal. An external signal transmission element can also be used to transmit the locking signal or the unlocking signal to the MCU, and then the MCU further recognizes and judges the digital signal of the illumination switch 7 so as to determine transmission of the connection instruction or the disconnection instruction to the lamp bead driving circuit. Therefore, the transmission manner for the locking signal and the unlocking signal is not specified restrictively in this embodiment.

Embodiment 3

As shown in FIGS. 5 and 6, on the basis of Embodiment 1 and Embodiment 2, the middle of the gear slider 53 is provided with an opening 531 on the side close to the toggle key 51 for accommodating the magnetic block 52, and the toggle key 51 is snap-fitted with the gear slider 53 and blocks the opening 531 so as to fix the magnetic block 52.

During practical application of this embodiment, the opening 531 formed on the side of the gear slider 53 close to the toggle key 51 can accommodate the toggle key 51, and the toggle switch 5 snap-fitted with the gear slider 53 is configured to block the opening 531 so as to mount and fix the magnetic block 52.

Specifically, two ends of the gear slider 53 are symmetrically provided with two snap-fitting grooves 532, and the side of the toggle key 51 close to the gear slider 53 is provided with two protrusions 511 fitted with the snap-fitting grooves 532.

It can be seen that the two snap-fitting grooves 532 symmetrically formed at the two ends of the gear slider 53 can be fitted with the two protrusions 511 at two ends of the toggle key 51 to achieve snap-fitting and fixing of the toggle key 51 and the gear slider 53.

Further, the side of the toggle key 51 away from the gear slider 53 is provided with anti-slip stripes 512.

It can be seen that by means of the anti-slip stripes 512 provided on the toggle key 51, when the toggle switch 5 is toggled, the friction force between the toggle switch and a finger can be increased, thereby facilitating one-hand adjustment.

Further, as shown in FIGS. 1-4, the flashlight tail 3 is set as a cylindrical body and is fixedly mounted at the end of the flashlight body 1 away from the lamp base 2.

It can be seen that the flashlight tail 3 is set as the cylindrical body to facilitate holding by hand, and the flashlight tail 3 is fixedly mounted at the tail end of the flashlight body 1 such that part of a battery connection device and other control devices can be accommodated inside the flashlight tail.

Specifically, the illumination switch 7 is set as a push switch, and the push switch is mounted on the side of the flashlight tail 3 away from the flashlight body 1.

During practical application of this embodiment, on/off signals of the lamp bead of the flashlight can be transmitted conveniently by means of the illumination switch 7, the illumination switch 7 can be pressed to transmit digital signals for turning on and turning off the lamp bead to the MCU, and thus the MCU can recognize and judge the signals conveniently; and the illumination switch is provided on the side of the flashlight tail 3 away from the flashlight body 1, such that when the flashlight is held by one hand, the flashlight can be turned on and turned off quickly and more conveniently.

As an example, in addition to directly fixing the flashlight tail 3 to the tail end of the flashlight body 1 in this embodiment, the flashlight tail can also be mounted at the tail end of the flashlight body 1 in a threaded manner, thereby achieving split production of the flashlight body 1 and the flashlight tail 3. Therefore, the mounting manner for the flashlight tail 3 is not specified restrictively.

The flashlight capable of achieving one-key locking is provided in the above embodiments of the present invention, by pushing the toggle switch 5 provided on the flashlight tail 3, switching of the different gears is achieved and a corresponding signal is transmitted to the control assembly, and after receiving the corresponding signal, the control assembly performs adjustment and outputs a corresponding instruction, thereby connecting or disconnecting the lamp bead driving circuit, and then achieving one-key locking of the illumination switch 7 of the flashlight. After locking, the lamp bead cannot emit light no matter whether the user presses the illumination switch 7 of the flashlight, thereby avoiding power waste caused when the user touches the illumination switch 7 by mistake; in addition, by means of the toggle switch 5 located on the flashlight tail 3 and capable of moving in the direction parallel to the axial direction of the flashlight body 1, when the flashlight body 1 is held by one hand, the gears can be changed by pushing the toggle switch 5 directly in the axial direction of the flashlight body 1, then one-key locking of the flashlight can be achieved, the operation process is relatively convenient, and the use requirements of the user can be met.

The above are only the preferred embodiments of the present invention, and are not intended to limit the present invention. Any modification, equivalent replacement and improvement made within the spirit and principles of the present invention should fall within the scope of protection of the present invention.

The invention claimed is:

1. A flashlight capable of achieving one-key locking, comprising an illumination switch (7), a flashlight body (1) and a lamp base (2) provided at one end of the flashlight body (1) and internally provided with a lamp bead, and further comprising: a flashlight tail (3) connected to another end of the flashlight body (1) away from the lamp base (2), a control assembly fixedly provided inside the flashlight tail (3) and in signal connection with a lamp bead driving circuit and the illumination switch (7) respectively, and a toggle switch (5) slidably mounted on an outer side of the flashlight tail (3) and provided with at least two gears in a direction parallel to an axial direction of the flashlight body (1), wherein the toggle switch (5) is configured to toggle in a reciprocating manner between the two adjacent gears so as to transmit a locking signal or an unlocking signal to the control assembly, and when the control assembly receives the locking signal from the toggle switch (5), the control assembly transmits a disconnection instruction to the lamp bead driving circuit; and when the control assembly receives the unlocking signal from the toggle switch (5), the control assembly recognizes a switch signal of the illumination switch (7) and transmits a connection instruction or the disconnection instruction to the lamp bead driving circuit according to a recognition result.

2. The flashlight according to claim 1, wherein the control assembly comprises: a microcontroller unit (MCU) and a Hall sensor (4) which are fixedly provided inside the flashlight tail (3), the Hall sensor (4) is electrically connected to the MCU, the MCU is in signal connection with the lamp bead driving circuit and the illumination switch (7) respectively, the toggle switch (5) is disposed close to the Hall sensor (4) and is configured to change an external magnetic field of the Hall sensor so as to change a voltage signal transmitted to the MCU by the Hall sensor (4), and the MCU is configured to recognize the locking signal or the unlocking signal according to different voltage signals.

3. The flashlight according to claim 2, wherein the flashlight tail (3) is inwardly provided with a sliding groove (6) from an outer side surface, the toggle switch (5) is slidably embedded in the sliding groove (6) and is provided with the two gears, a toggle direction of the toggle switch (5) is parallel to the axial direction of the flashlight body (1), and the toggle switch can be in contact with inner walls of two sides of the sliding groove (6) parallel to the axial direction of the flashlight body (1) respectively, so as to achieve switching of the two gears.

4. The flashlight according to claim 3, wherein the toggle switch (5) comprises: a toggle key (51), a magnetic block (52) and a gear slider (53) which are sequentially connected from outside to inside, the gear slider (53) is slidably mounted inside the sliding groove (6), and an outer side wall of the toggle key (51) is exposed out of an end port of the sliding groove (6).

5. The flashlight according to claim 4, wherein the sliding groove (6) comprises: a first square groove (61) and a second square groove (62) which are sequentially connected from outside to inside and have lengthwise directions parallel to the axial direction of the flashlight body (1), the length of the first square groove (61) is less than the length of the second square groove (62), and the width of the first square groove (61) is less than the width of the second square groove (62); the gear slider (53) is slidably connected inside the second square groove (62), outer walls of two sides of the gear slider respectively abut against inner walls of two sides of the second square groove (62) in a widthwise direction, and outer walls of another two sides of the gear slider are configured to be in contact with inner walls of two sides of the second square groove (62) in a lengthwise direction respectively so as to achieve change of the magnetic field of the Hall sensor (4); and the outer side wall of the toggle key (51) is exposed out of the first square groove (61).

6. The flashlight according to claim 4, wherein the middle of the gear slider (53) is provided with an opening (531) on the side close to the toggle key (51) for accommodating the magnetic block (52), and the toggle key (51) is snap-fitted with the gear slider (53) and blocks the opening (531) so as to fix the magnetic block (52).

7. The flashlight according to claim 6, wherein two ends of the gear slider (53) are symmetrically provided with two snap-fitting grooves (532), and the side of the toggle key (51) close to the gear slider (53) is provided with two protrusions (511) fitted with the snap-fitting grooves (532).

8. The flashlight according to claim 4, wherein the side of the toggle key (51) away from the gear slider (53) is provided with anti-slip stripes (512).

9. The flashlight according to claim 1, wherein the flashlight tail (3) is set as a cylindrical body and is fixedly mounted at the end of the flashlight body (1) away from the lamp base (2).

10. The flashlight according to claim 1, wherein the illumination switch (7) is set as a push switch, and the push switch is mounted on the side of the flashlight tail (3) away from the flashlight body (1).

11. The flashlight according to claim 2, wherein the illumination switch (7) is set as a push switch, and the push switch is mounted on the side of the flashlight tail (3) away from the flashlight body (1).

12. The flashlight according to claim 3, wherein the illumination switch (7) is set as a push switch, and the push switch is mounted on the side of the flashlight tail (3) away from the flashlight body (1).

13. The flashlight according to claim 4, wherein the illumination switch (7) is set as a push switch, and the push switch is mounted on the side of the flashlight tail (3) away from the flashlight body (1).

14. The flashlight according to claim 5, wherein the illumination switch (7) is set as a push switch, and the push switch is mounted on the side of the flashlight tail (3) away from the flashlight body (1).

15. The flashlight according to claim 6, wherein the illumination switch (7) is set as a push switch, and the push switch is mounted on the side of the flashlight tail (3) away from the flashlight body (1).

16. The flashlight according to claim 7, wherein the illumination switch (7) is set as a push switch, and the push switch is mounted on the side of the flashlight tail (3) away from the flashlight body (1).

17. The flashlight according to claim 8, wherein the illumination switch (7) is set as a push switch, and the push switch is mounted on the side of the flashlight tail (3) away from the flashlight body (1).

18. The flashlight according to claim 9, wherein the illumination switch (7) is set as a push switch, and the push switch is mounted on the side of the flashlight tail (3) away from the flashlight body (1).

* * * * *